(12) United States Patent
Watanabe et al.

(10) Patent No.: US 10,847,047 B2
(45) Date of Patent: Nov. 24, 2020

(54) INFORMATION PROCESSING DEVICE, INFORMATION PROCESSING METHOD, AND COMPUTER PROGRAM

(71) Applicant: SONY CORPORATION, Tokyo (JP)

(72) Inventors: Kazuhiro Watanabe, Tokyo (JP); Masaaki Isozu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 374 days.

(21) Appl. No.: 15/518,808

(22) PCT Filed: Oct. 21, 2015

(86) PCT No.: PCT/JP2015/079634
§ 371 (c)(1),
(2) Date: Apr. 13, 2017

(87) PCT Pub. No.: WO2016/084519
PCT Pub. Date: Jun. 2, 2016

(65) Prior Publication Data
US 2017/0229034 A1 Aug. 10, 2017

(30) Foreign Application Priority Data
Nov. 27, 2014 (JP) ................. 2014-239546

(51) Int. Cl.
*G09B 7/077* (2006.01)
*G09B 7/02* (2006.01)
(Continued)

(52) U.S. Cl.
CPC ............. *G09B 7/077* (2013.01); *G09B 7/02* (2013.01); *G09B 7/06* (2013.01); *G09B 5/02* (2013.01);
(Continued)

(58) Field of Classification Search
CPC .......... G09B 7/7077; G09B 7/02; G09B 7/06
See application file for complete search history.

(56) References Cited

U.S. PATENT DOCUMENTS 7,402,105 B1 * 7/2008 Hutter .................... A63F 13/12
463/42
7,882,041 B2 * 2/2011 Gibbons ............ G06Q 50/2053
705/326
(Continued)

FOREIGN PATENT DOCUMENTS

| JP | 59-131385 A | 7/1984 |
| JP | 8-160848 A | 6/1996 |

(Continued)

OTHER PUBLICATIONS

International Search Report dated Jan. 12, 2016 in PCT/JP2015/079634.

*Primary Examiner* — Xuan M Thai
*Assistant Examiner* — Sadaruz Zaman
(74) *Attorney, Agent, or Firm* — Xsensus LLP

(57) ABSTRACT

[Object] Provided is an information processing device that can dynamically determine point allocation of a question and provide a user with enjoyment of receiving a test.
[Solution] Provided is the information processing device including a control unit configured to determine point allocation of each question in a test on a basis of answer results of the test made by a plurality of users during a test time, calculate a score of a predetermined user on a basis of the point allocation in response to a request of the predetermined user, and generate information for disclosing the score of the predetermined user.

13 Claims, 19 Drawing Sheets

(51) Int. Cl.
*G09B 5/02* (2006.01)
*G09B 7/00* (2006.01)
*G09B 7/06* (2006.01)
*G09B 5/06* (2006.01)

(52) U.S. Cl.
CPC ............... *G09B 5/06* (2013.01); *G09B 5/062* (2013.01); *G09B 7/00* (2013.01)

(56) References Cited

U.S. PATENT DOCUMENTS

| | | | | |
|---|---|---|---|---|
| 2004/0080509 | A1* | 4/2004 | Hosokawa | G09B 7/02 345/440 |
| 2006/0160054 | A1* | 7/2006 | Onishi | G09B 7/02 434/322 |
| 2010/0223092 | A1* | 9/2010 | Kitabatake | G06Q 10/063 705/7.11 |
| 2011/0020781 | A1* | 1/2011 | Yang | G06Q 30/02 434/350 |
| 2015/0079576 | A1* | 3/2015 | Obae | G09B 7/00 434/350 |
| 2016/0093229 | A1* | 3/2016 | Mayumi | G06Q 10/101 434/350 |
| 2016/0125758 | A1* | 5/2016 | Hong | G09B 19/00 434/236 |
| 2017/0116870 | A1* | 4/2017 | Brem | G09B 5/04 |
| 2017/0316710 | A1* | 11/2017 | Ikenaga | G09B 7/07 |
| 2018/0286265 | A1* | 10/2018 | Matsumoto | G06F 7/588 |
| 2019/0272769 | A1* | 9/2019 | Yasuoka | G09B 7/04 |

FOREIGN PATENT DOCUMENTS

| | | |
|---|---|---|
| JP | 8-299594 A | 11/1996 |
| JP | 2000-98867 A | 4/2000 |
| JP | 2002-202712 A | 7/2002 |
| JP | 2003-50535 A | 2/2003 |
| JP | 2004-264780 A | 9/2004 |
| JP | 2005-115344 A | 4/2005 |
| JP | 2011-28273 A | 2/2011 |
| JP | 2013-142718 A | 7/2013 |

* cited by examiner

EXAMINEE'S NUMBER 12345678  EXAMINEE'S NAME ○○○   REMAINING TIME 09:59:29

QUESTION 1

QUESTION TITLE

QUESTION SENTENCE

CHOOSE ONE ANSWER

| 1 | ANSWER 1 |  | 2 | ANSWER 2 ☑ |  | 3 | ANSWER 3 |  | 4 | ANSWER 4 |

FIG.10

| | QUESTION 1 | QUESTION 2 | QUESTION 3 | QUESTION 4 | QUESTION 5 |
|---|---|---|---|---|---|
| BASIC VALUE | 0.5 | 1 | 1 | 1 | 1.5 |
| POINT ALLOCATION BASED ON BASIC VALUE | 60 POINTS | 120 POINTS | 120 POINTS | 120 POINTS | 180 POINTS |

FIG. 11

| | QUESTION 1 | QUESTION 2 | QUESTION 3 | QUESTION 4 | QUESTION 5 |
|---|---|---|---|---|---|
| DIFFICULTY | 1 | 2 | 4 | 3 | 5 |
| POINT ALLOCATION BASED ON DIFFICULTY | 26 POINTS | 52 POINTS | 104 POINTS | 78 POINTS | 130 POINTS |

FIG.12

| | QUESTION 1 | QUESTION 2 | QUESTION 3 | QUESTION 4 | QUESTION 5 |
|---|---|---|---|---|---|
| POINT ALLOCATION BASED ON BASIC VALUE | 60 POINTS | 120 POINTS | 120 POINTS | 120 POINTS | 180 POINTS |
| POINT ALLOCATION BASED ON DIFFICULTY | 26 POINTS | 52 POINTS | 104 POINTS | 78 POINTS | 130 POINTS |
| BASE POINT-ALLOCATION | 86 POINTS | 172 POINTS | 224 POINTS | 198 POINTS | 310 POINTS |

FIG.15

EXAMINEE'S NUMBER 12345678  EXAMINEE'S NAME ○○○  REMAINING TIME 09:59:29

QUESTION 1

YOUR ORDER

NUMBER OF PERSONS

PRESENT
BEFORE 10 MIN

TIMING OF ELAPSE OF 30 MIN

583/1000 POINTS 0    500    1000

CHOOSE ONE ANSWER

| 1 | ANSWER 1 | 2 | ANSWER 2 ☑ | 3 | ANSWER 3 | 4 | ANSWER 4 |

| | QUESTION 1 | QUESTION 2 | QUESTION 3 | QUESTION 4 | QUESTION 5 |
|---|---|---|---|---|---|
| BASIC VALUE | 60 POINTS | 120 POINTS | 120 POINTS | 120 POINTS | 180 POINTS |
| RELATIVE VALUE | 26 POINTS | 52 POINTS | 104 POINTS | 78 POINTS | 130 POINTS |
| BASE POINT-ALLOCATION OF 3-PERSON TEAM | 86 POINTS | 172 POINTS | 224 POINTS | 198 POINTS | 310 POINTS |
| BASE POINT-ALLOCATION OF 4-PERSON TEAM | 64.5 POINTS | 129 POINTS | 168 POINTS | 148.5 POINTS | 232.5 POINTS |

INFORMATION PROCESSING DEVICE, INFORMATION PROCESSING METHOD, AND COMPUTER PROGRAM

TECHNICAL FIELD

The present disclosure relates to an information processing device, an information processing method, and a computer program.

BACKGROUND ART

Such a technology is disclosed that a class is given to users online via a network such as the Internet or Intranet, a question is given to the users, and the users are allowed to answer the question (e.g., refer to Patent Literatures 1 and 2).

CITATION LIST

Patent Literature

Patent Literature 1: JP9-34344A
Patent Literature 2: JP2001-249609A

DISCLOSURE OF INVENTION

Technical Problem

Conventionally, a user answers a prepared question, and scores are given based on an answer result thereof. However, point allocation of a question is predetermined and there is not a difference between users in a case of answering the same question. Therefore, among users that correctly answered the same question, a user with higher depth-of-understanding or abilities cannot be correctly evaluated. Further, action for conducting a test itself lacks fun.

Accordingly, the disclosure proposes an information processing device, an information processing method, and a computer program with novelty and improvement, that can more accurately score abilities of users and present enjoyment of taking a test to the users by dynamically determining point allocation of a question.

Solution to Problem

According to the present disclosure, there is provided an information processing device including: a control unit configured to determine point allocation of each question in a test on a basis of answer results of the test made by a plurality of users during a test time, calculate a score of a predetermined user on a basis of the point allocation in response to a request of the predetermined user, and generate information for disclosing the score of the predetermined user.

In addition, according to the present disclosure, there is provided an information processing method including: determining point allocation of each question in a test on a basis of answer results of the test made by a plurality of users during a test time; calculating a score of a predetermined user on a basis of the point allocation in response to a request of the predetermined user; and generating information for disclosing the score of the predetermined user.

In addition, according to the present disclosure, there is provided a computer program for causing a computer to execute: determining point allocation of each question in a test on a basis of answer results of the test made by a plurality of users during a test time; calculating a score of a predetermined user on a basis of the point allocation in response to a request of the predetermined user; and generating information for disclosing the score of the predetermined user.

Advantageous Effects of Invention

As mentioned above, according to the present disclosure, it is possible to provide an information processing device, an information processing method, and a computer program with novelty and improvement, that can more accurately score abilities of users and present enjoyment of taking a test to the users by dynamically determining point allocation of a question.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 6 is an explanatory diagram showing an example of a GUI displayed by a display unit 240 of the answering terminal 200.

FIG. 10 is an explanatory diagram showing determination of point allocation of each question on the basis of a basic value.

FIG. 11 is an explanatory diagram showing calculation of a relative value that changes depending on relative difficulty between questions.

FIG. 12 is an explanatory diagram showing calculation of base point-allocation.

FIG. 15 is an explanatory diagram showing an example of a GUI displayed by a display unit 240 of the answering terminal 200.

FIG. 19 is an explanatory diagram showing an example of re-calculation of base point-allocation on the basis of a minimal number of team persons.

MODE(S) FOR CARRYING OUT THE INVENTION

Figure 1:
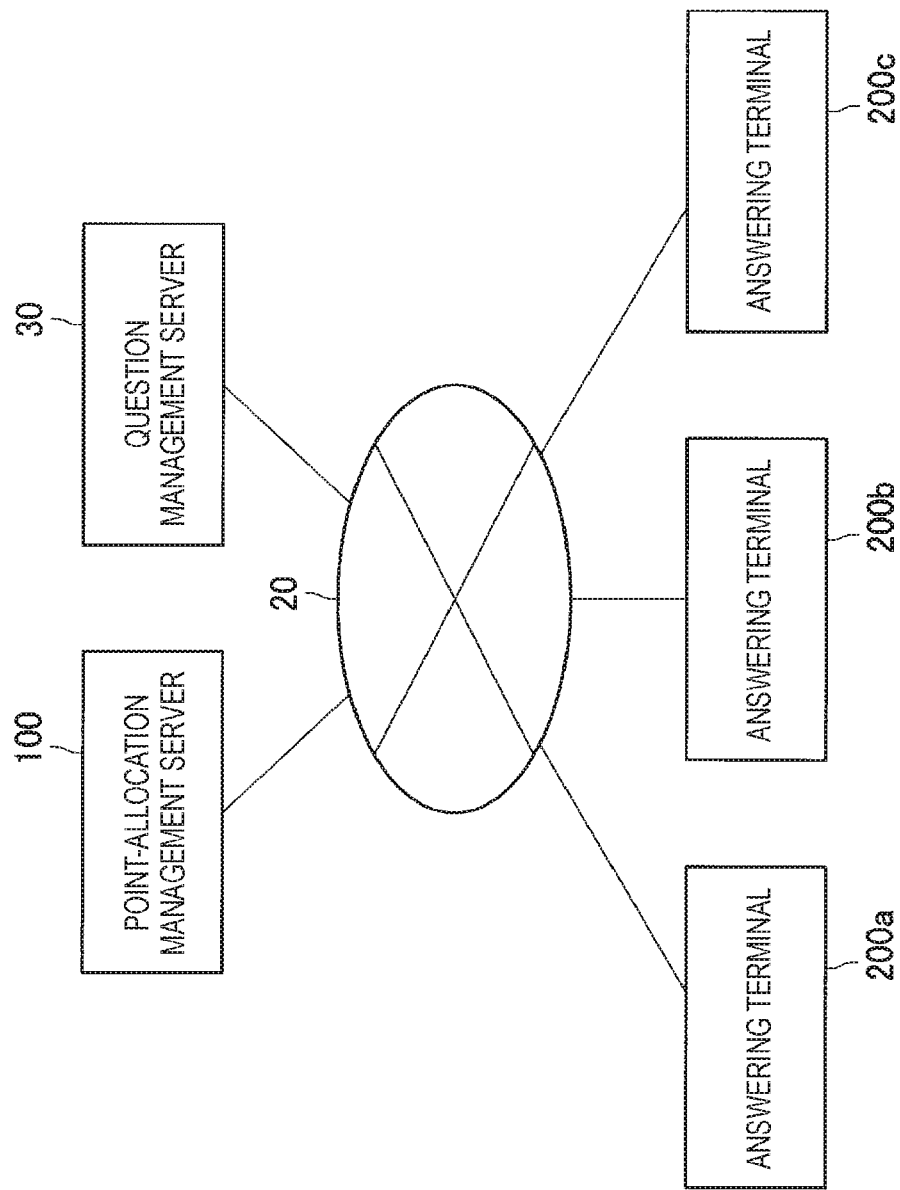
FIG. 1 is an explanatory diagram showing a configuration example of an information processing system 10 according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that a description will be given in the following order.
1. An embodiment of the present disclosure
   1.1. Background
   1.2. Configuration example
   1.3. Operational example
   1.4. Modification
2. Hardware configuration example
3. Conclusion

1. AN EMBODIMENT OF THE PRESENT DISCLOSURE

1.1. Background

A description will be given of a background of the present disclosure before specifically explaining an embodiment of the present disclosure.

As described above, there is such a technology that a class is given to users online via a network such as the Internet or Intranet, a question is given to the users, and the users are allowed to answer the question. Not only answering to a question online but also point allocation is determined for every question in advance in previous test questions, and scores are given on the basis of the point allocation.

When point allocation is determined for each question in advance, and scores are given on the basis of the point allocation, it has been difficult to correctly determine abilities of a user because scores to the same question are equal between a user that answered the question in ten minutes and a user that answered the question in thirty minutes with respect to the same question. Further, the existing test is, originally, only action for determining abilities that scores are given based on predetermined point allocation and a result thereof is shown, and lacks fun of action for taking a test itself.

Accordingly, the discloser examines, in consideration of the contents, a technology capable of dynamically changing point allocation of a question during a test time, and providing a user with enjoyment of action for taking a test by disclosing a current score of the user. As a result, as will be described later, the discloser devised a technology that dynamically changes point allocation of a question during a test time in accordance with an answer result of another user, and provides a user with enjoyment of action for taking a test by disclosing a current score of the user.

The background of the embodiment of the present disclosure has been described above. Subsequently, the embodiment of the present disclosure will be specifically described.

1.2. Configuration Example

FIG. 1 is an explanatory diagram showing a configuration example of an information processing system 10 according to an embodiment of the present disclosure. FIG. 1 shows a configuration example of the information processing system 10 in which a question is given to a user within a predetermined test time, the user is allowed to answer the question, and a score is given to the answer of the user.

The information processing system 10 according to the present embodiment has a prescription that a plurality of users are allowed to simultaneously answer a question within a predetermined test time. Note that the predetermined test time may be a time determined in advance or a predetermined time within a time zone determined in advance. Further, in the present embodiment, a user who attends the test can include both a user who actually answers the question and a user who does not answer the question but checks the situation of a user that answers the question. Hereinbelow, a description will be given of a configuration example of the information processing system 10 according to the embodiment of the present disclosure by use of FIG. 1.

As shown in FIG. 1, the information processing system 10 according to the embodiment of the present disclosure includes: a question management server 30; a point-allocation management server 100; and answering terminals 200*a*, 200*b*, and 200*c*. The question management server 30, the point-allocation management server 100, and the answering terminals 200*a*, 200*b*, and 200*c* are connected to a network 20 such as the Internet or Intranet, respectively. Note that, in the following description, the answering terminals 200*a* to 200*c* can be generically called as merely an answering terminal 200.

The question management server 30 is a server that manages the question given to a user. The question management server 30 holds a question given to the user in advance, at a test time, discloses the held question, and allows the user to answer the question with the answering terminals 200*a* to 200*c*. Note that the question held by the question management server 30 is also provided to the point-allocation management server 100.

The point-allocation management server 100 is a server that manages the point allocation of a question given to the user. The point-allocation management server 100 determines the point allocation of each question in response to the presentation of the question from the question management server 30, which will be described later. The point-allocation management server 100 determines the point allocation of each question, and generates information for disclosing the determined point allocation and scores of the respective users based on the determined point allocation. Further, the point-allocation management server 100 discloses the point allocation of each question and the score of the user during the test time in response to requests from the answering terminals 200*a* to 200*c* used by the users at a predetermined timing.

The answering terminals 200a to 200c are terminals for answering a question given from the question management server 30 and checking an answering situation of another user, e.g., devices such as a personal computer, a tablet-type terminal, and a smartphone (sophisticated mobile phone). A user who attends a test and answers a question uses a keyboard, a mouse, a touch panel, or the like to answer a question given from the question management server 30 with the answering terminals 200a to 200c within a predetermined test time. The answering terminals 200a to 200c answer the question given from the question management server 30, and then send the answer to the question management server 30 and the point-allocation management server 100.

The answering terminals 200a to 200c obtain information of the point allocation of each question and the score of the user in addition to the question given from the question management server 30 from the point-allocation management server 100 during the test time. The answering terminals 200a to 200c obtain the information of the point allocation of each question and the score of the user from the point-allocation management server 100 during the test time, thereby presenting the current point allocation of each question and the score of the user to the user who is attending the test during the test time.

In the present embodiment, the example has been given of the question management server 30 and the point-allocation management server 100 as individual servers. However, the present disclosure is not limited to the example, functions of the question management server 30 and the point-allocation management server 100 may be integrated into one server, and the function of one server may be distributed into a plurality of devices.

Further, in the present embodiment, the example is given in which there are three answering terminals 200a to 200c. However, the present disclosure is not limited to the example. Obviously, the number of answering terminals can be changed depending on the number of users who attend the test.

As mentioned above, the description has been given of the configuration example of the information processing system 10 according to the embodiment of the present disclosure by use of FIG. 1. Subsequently, a description will be given of a functional configuration example of the point-allocation management server 100 according to the embodiment of the present disclosure.

Figure 2:
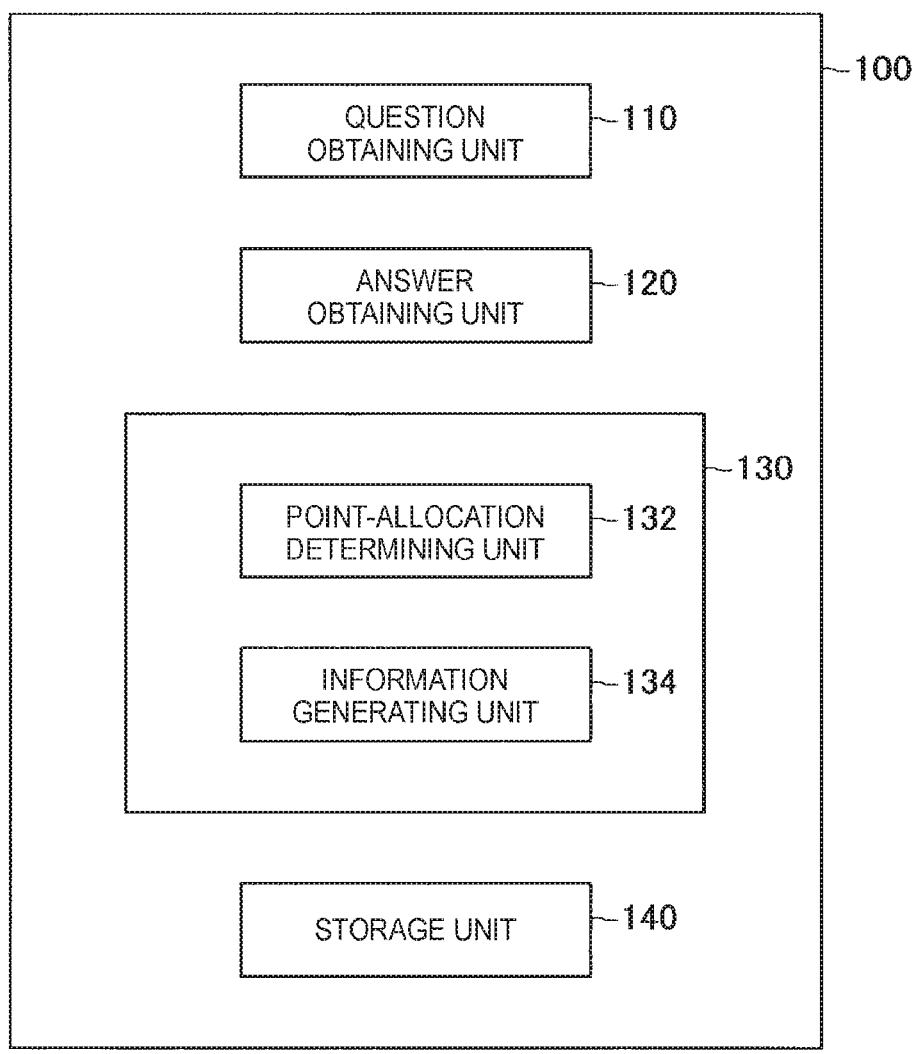
FIG. 2 is an explanatory diagram showing a functional configuration example of a point-allocation management server 100 according to an embodiment of the present disclosure.

FIG. 2 is an explanatory diagram showing a functional configuration example of the point-allocation management server 100 according to the embodiment of the present disclosure. FIG. 2 shows the functional configuration example of the point-allocation management server 100 that obtains a question that allows the user to answer from the question management server 30, determines the point allocation of the question, and executes processing for calculating the score of each user. Hereinbelow, a description will be given of the functional configuration example of the point-allocation management server 100 according to the embodiment of the present disclosure by use of FIG. 2.

As shown in FIG. 2, the point-allocation management server 100 according to the embodiment of the present disclosure includes a question obtaining unit 110, an answer obtaining unit 120, a control unit 130, a point-allocation determining unit 132, and an information generating unit 134.

The question obtaining unit 110 obtains a question for which the point-allocation determining unit 132 determines the point allocation from the question management server 30. Further, the question obtaining unit 110 may obtain information related to the respective questions when the point-allocation determining unit 132 determines the point allocation.

The answer obtaining unit 120 obtains answers input by the answering terminals 200a to 200c to the question given from the question management server 30. The answer obtaining unit 120 obtains, for example, information for identifying the user who answered the question, information for identifying the answered question, an answer to the question, and information of time for answering the question, when obtaining the answers input by the answering terminals 200a to 200c. The information for identifying the user who answered the question may be an actual user name (real name or modified name), or may be user ID for uniquely identifying the user. The time for answering the question may be a relative time from the start time of test, or an absolute time for actual answer. However, the absolute time can be changed by setting of the answering terminals 200a to 200c. Therefore, a time for answering the question is preferably obtained from the relative time from the start time of test.

The control unit 130 includes, e.g., a central processing unit (CPU), a read only memory (ROM), and a random access memory (RAM), and controls operations of the point-allocation management server 100. As shown in FIG. 2, the control unit 130 includes the point-allocation determining unit 132, and the information generating unit 134.

The point-allocation determining unit 132 determines the obtained point allocation of each question based on the question obtained by the question obtaining unit 110 and the answer of each user to the question obtained by the answer obtaining unit 120, and also calculates the score of each user on the basis of the determined point allocation. A specific description will be given of a determining method of the point allocation of each question obtained by the point-allocation determining unit 132.

The information generating unit 134 generates information for allowing the answering terminals 200a to 200c to perform display in, e.g., a graphical user interface (GUI) form. The information generating unit 134 generates, for example, information for allowing the answering terminals 200a to 200c to display various information about a test such as contents or point allocation of each question, the current score or order of the user, and score of another user.

The information generating unit 134 generates information for allowing the answering terminals 200a to 200c to display various information about the test on the basis of the point-allocation determined by the point-allocation determining unit 132, the score of each user, and information stored in the storage unit 140.

The information generated by the information generating unit 134 is sent to the answering terminals 200a to 200c in response to requests from the answering terminals 200a to 200c or at a predetermined timing, predetermined processing is performed in the answering terminals 200a to 200c, and the information is displayed on the answering terminals 200a to 200c.

The storage unit 140 can include various storage media such as a ROM and a RAM. The storage unit 140 stores a program or various information for operating the point-allocation management server 100. The information stored in the storage unit 140 can include, for example, various information about a user who answers a question by using the answering terminal 200. The various information about the user who answers the question by using the answering terminal 200 can include, for example, a name of a user, an answering situation of the user, and a past usage situation of the information processing system 10 of the user.

The point-allocation management server 100 according to the embodiment of the present disclosure has the configuration shown in FIG. 2, and can thus obtain the question to be answered by the user from the question management server 30, determine the point-allocation of the question, and calculate the score of each user. The point-allocation management server 100 according to the embodiment of the present disclosure has the configuration shown in FIG. 2, and can thus generate information for allowing the answering terminals 200a to 200c to display the determined point allocation and the score of each user.

As mentioned above, the description has been given of the functional configuration example of the point-allocation management server 100 according to the embodiment of the present disclosure by use of FIG. 2. Subsequently, a description will be given of a functional configuration example of the answering terminal 200 according to the embodiment of the present disclosure.

Figure 3:
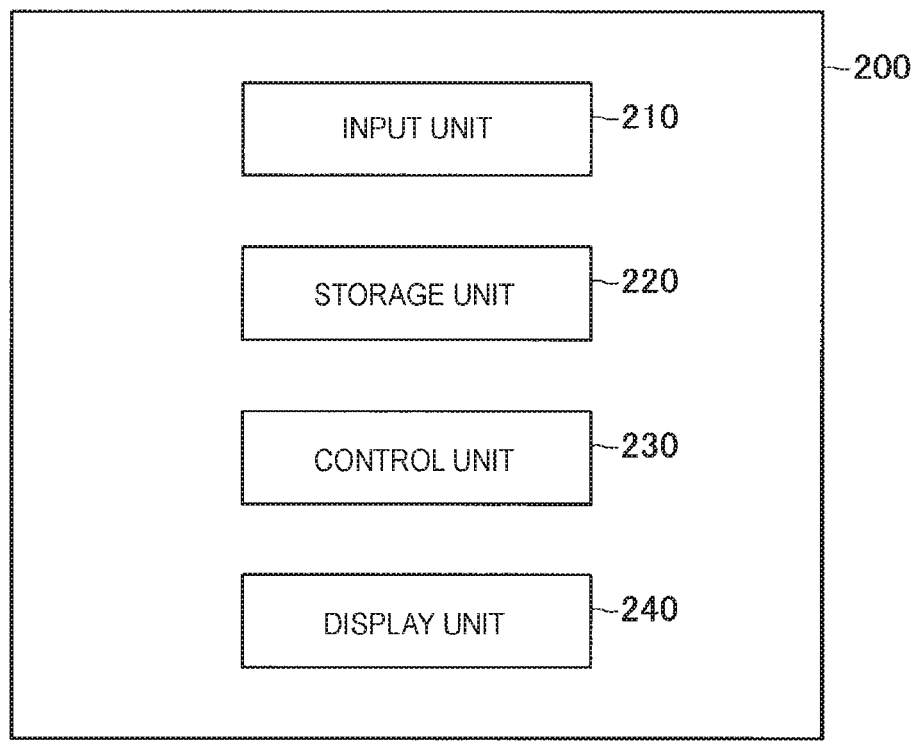
FIG. 3 is an explanatory diagram showing a functional configuration example of an answering terminal 200 according to an embodiment of the present disclosure.

FIG. 3 is an explanatory diagram showing a functional configuration example of the answering terminal 200 according to the embodiment of the present disclosure. FIG. 3 shows the functional configuration example of the answering terminal 200 for answering the question given from the question management server 30 and viewing information about the point allocation and the score provided from the point-allocation management server 100. Hereinbelow, a description will be given of the functional configuration example of the answering terminal 200 according to the embodiment of the present disclosure by use of FIG. 3.

As shown in FIG. 3, the answering terminal 200 according to the embodiment of the present disclosure includes an input unit 210, a storage unit 220, a control unit 230, and a display unit 240.

The input unit 220 is various input devices that receive inputs from the user, and may include a keyboard, a mouse, and a touch panel, for example.

Further, various sensing devices also can function as the input unit 220. Such sensing devices can include a sensor that acquires the current position, such as a global positioning system (GPS), global navigation satellite system (GLONASS), and BeiDou Navigation Satellite System (BDS), a camera, a camera with depth information, a human detection sensor, and a microphone, for example.

Such sensing devices detect acceleration and angular speed applied to the device, direction, illuminance, temperature, atmospheric pressure, and the like. The above various sensing devices, for example, in a case where an apparatus including the sensing devices is carried by or attached to a user, can detect various information as information about the user, e.g., information indicating movement or direction of the user. The sensing devices may also include a sensor that detects biological information of the user, such as heart beats, sweat, brain waves, a sense of touching, a sense of smelling, and a sense of tasting.

The storage unit 220 can have various storage media such as a ROM and a RAM. The storage unit 220 stores a program or various information for operations of the answering terminal 200. The program and various information stored in the storage unit 220 are occasionally read by the control unit 230.

The control unit 230 includes, for example, a CPU, a ROM, and a RAM, and controls operations of the answering terminal 200. In the present embodiment, the control unit 230, for example, controls the display of the GUI to the display unit 240, and executes various processing to an input operation with the input unit 210 by the user to the GUI.

The display unit 240 includes a display panel such as a liquid crystal display or an organic EL display, and is a device that displays various information such as a character or an image. In the present embodiment, the display unit 240 displays a question given by the question management server 30, point allocation of each question calculated by the point-allocation management server 100, a score of a user, and another information with predetermined GUI, as will be described later. Note that the display unit 240 may have a touch panel, and an input operation may be received by allowing the user to touch the display unit 240.

Herein, an example is shown of the GUI displayed by the display unit 240 in the answering terminal 200. FIGS. 4 to 7 are explanatory diagrams showing examples of the GUI displayed by the display unit 240 in the answering terminal 200. The GUIs shown in FIGS. 4 to 7 are displayed on the display unit 240, e.g., under control of the control unit 230. Note that the GUI, which will be described later, may be displayed on the display unit 240 by execution of dedicated application on the answering terminal 200, or may be displayed on the display unit 240 by execution of general application such as a Web browser on the answering terminal 200.

Figure 4:
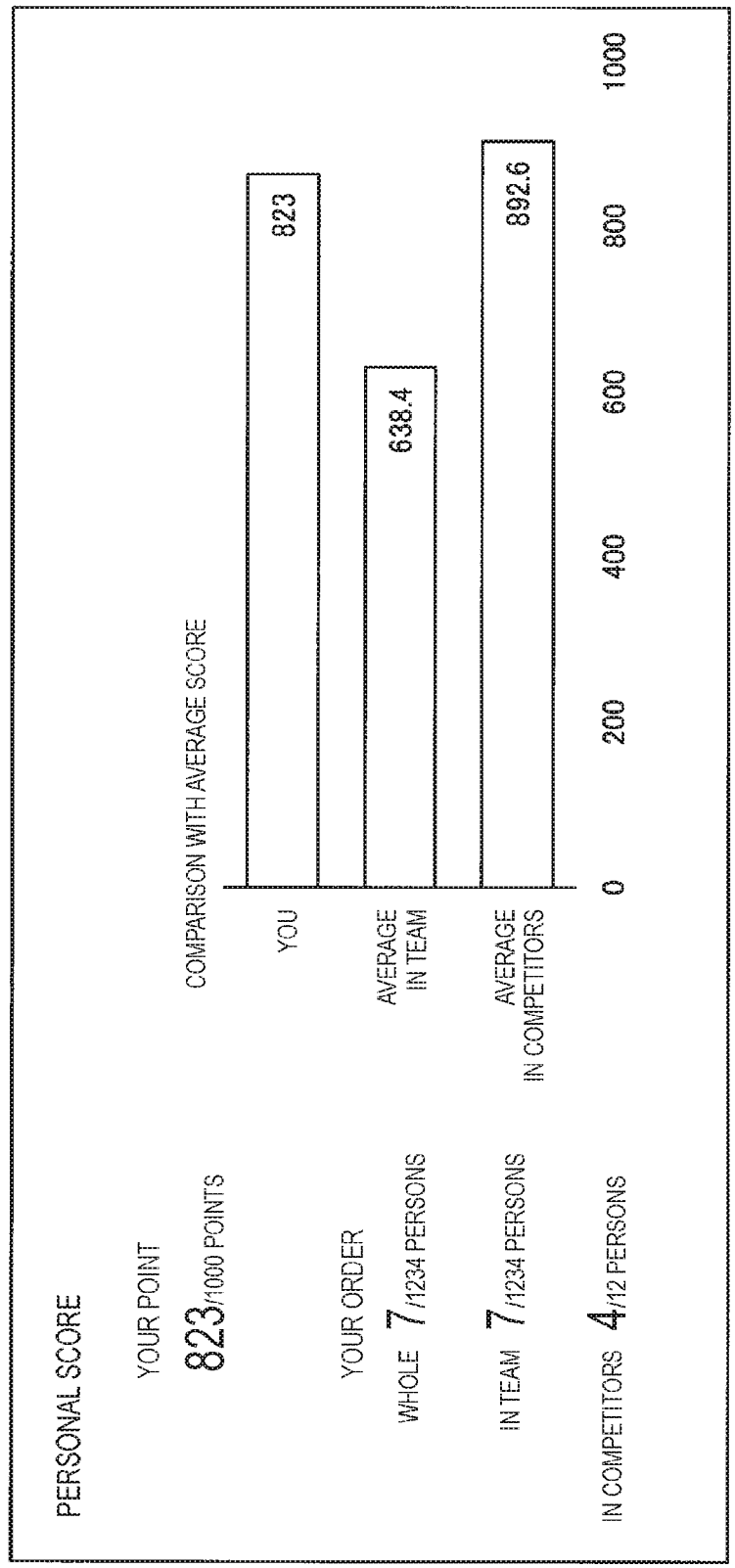
FIG. 4 is an explanatory diagram showing an example of a GUI displayed by a display unit 240 of the answering terminal 200.

A GUI 301 shown in FIG. 4 is an example of a GUI for displaying a personal score of the user after ending the test. The GUI 301 shown in FIG. 4 shows score, order, and comparison with average score of a user. The order of the user shows the order in the whole, the order within a team, and the order within competitors. The team includes other users who are pointed out in advance by the user. Further, the competitors are other users who are pointed out for the purpose of competition of scores in advance by the user. The users pointed out as the team may be overlapped with members pointed out as competitors.

Figure 5:
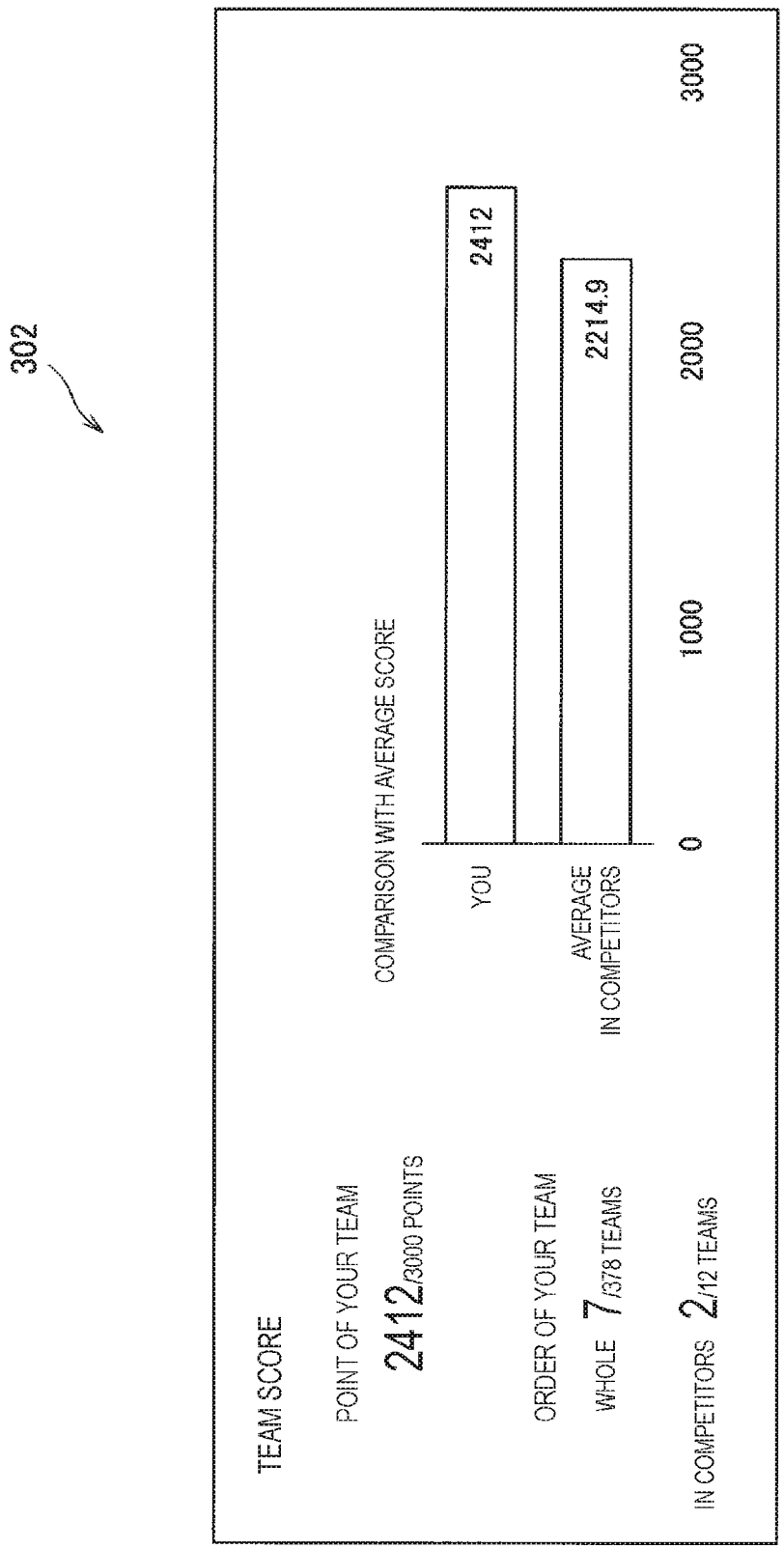
FIG. 5 is an explanatory diagram showing an example of a GUI displayed by a display unit 240 of the answering terminal 200.

A GUI 302 shown in FIG. 5 is an example of the GUI for displaying the scores of the team after ending the test. The GUI 302 shown in FIG. 5 shows comparison of the total points, the order, and the average score of the team. The order of the team shows the order in the whole and the order within the competitor team.

A GUI 303 shown in FIG. 6 is an example of the GUI for displaying a question sentence during the test time. The GUI 303 shown in FIG. 6 shows an examinee's number and a name of a user, the remaining time until the test end, a question number and a question sentence, and an option of an answer to a question.

Figure 7:
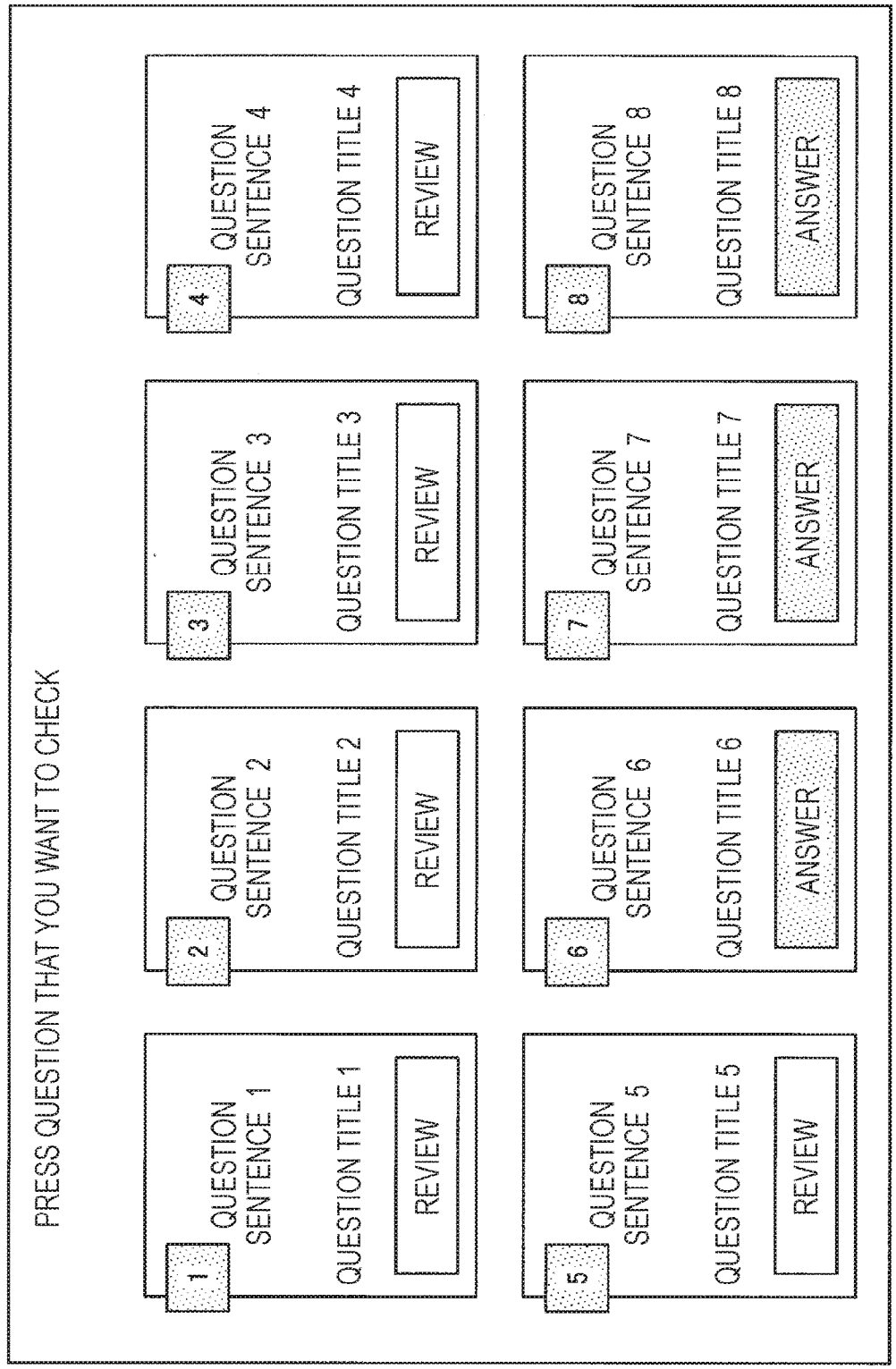
FIG. 7 is an explanatory diagram showing an example of a GUI displayed by a display unit 240 of the answering terminal 200.

A GUI 304 shown in FIG. 7 is an example of the GUI for displaying a list of questions during the test time. The GUI 304 shown in FIG. 7 shows a question number of each question, a question sentence and a question title, and buttons for answering and reviewing each question.

The GUI displayed by the display unit 240 in the answering terminal 200 is not limited to the example. However, the GUIs shown in FIGS. 4 to 7 are for allowing the user to usually answer a question and presenting a result of answering the question by the user after ending the test. Action for taking the test cannot be enjoyment for the user.

Accordingly, in the present embodiment, it is a purpose to display the point allocation of each question and display information such as the current score or order of the user on the basis of the point allocation of each question, thereby allowing users to enjoy the action for taking a test. Hereinbelow, a description will be given of a GUI for displaying point allocation of each question and displaying information such as the current score or order of a user on the basis of the point allocation of each question, and an operation of the point-allocation management server 100 for displaying the GUI.

As mentioned above, the description has been given of the functional configuration example of the answering terminal 200 according to the embodiment of the present disclosure by use of FIG. 3. Subsequently, a description will be given of an operational example of the point-allocation management server 100 according to the embodiment of the present disclosure.

1.3. Operational Example

Figure 8:
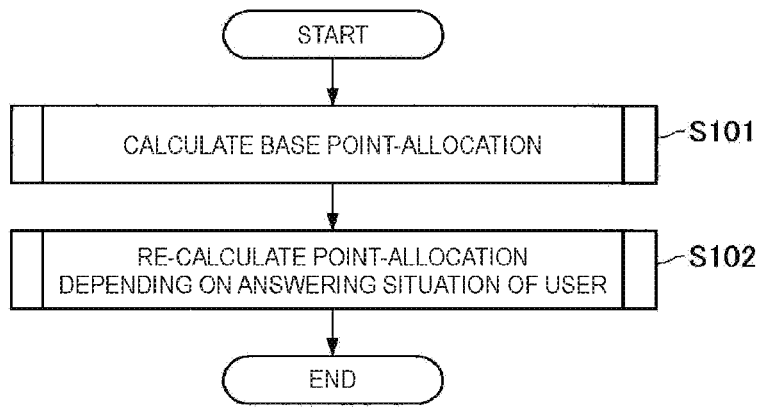
FIG. 8 is a flow chart showing an operational example of the point-allocation management server 100 according to an embodiment of the present disclosure.

FIG. 8 is a flow chart showing an operational example of the point-allocation management server 100 according to the embodiment of the present disclosure. FIG. 8 shows an operational example of the point-allocation management server 100 according to the embodiment of the present disclosure, when determining the point allocation of a question to be answered by the user during the test time. Hereinbelow, a description will be given of an operational example of the point-allocation management server 100 according to the embodiment of the present disclosure by use of FIG. 8.

The point-allocation management server 100, when determining the point allocation of the question to be answered by the user, first calculates base point-allocation (step S101). The calculation of the base point-allocation is executed by, e.g., the point-allocation determining unit 132. The base point-allocation is point allocation as a reference of each question. The details will be described later. The base point-allocation is determined by a rate of point allocation between respective questions and relative difficulty.

The point-allocation management server 100, after calculating the base point-allocation in step S101, subsequently re-calculates the point allocation depending on an answering situation of the user by using the calculated base point-allocation as a reference (step S102). The re-calculation of the point allocation is executed by, e.g., the point-allocation determining unit 132. The details of the re-calculation of the point allocation depending on the answering situation of the user will be described later. In the present embodiment, it is assumed that the point allocation depending on the answering situation of the user is re-calculated to be reduced from the base point-allocation in accordance with the time after the question was first answered.

The point-allocation management server 100 according to the embodiment of the present disclosure executes the above-mentioned operations, thereby determining the point allocation of the question to be answered by the user during the test time. The point-allocation management server 100 according to the embodiment of the present disclosure determines the point allocation of each question during the test time, thereby disclosing the determined point allocation and the score of the user based on the point allocation to the answering terminal 200.

As mentioned above, the description has been given of the operational example of the point-allocation management server 100 according to the embodiment of the present disclosure by use of FIG. 8. Subsequently, a specific description will be given of each processing in the flow chart shown in FIG. 8.

Figure 9:
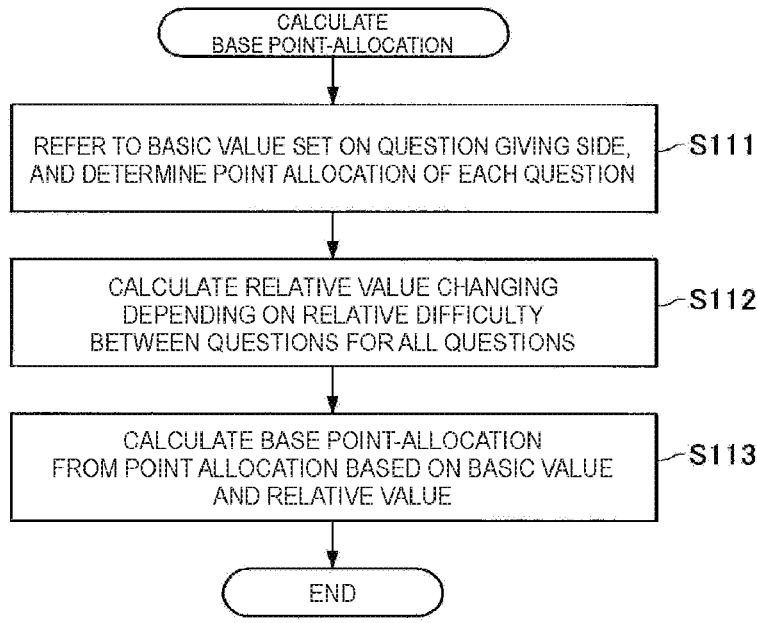
FIG. 9 is a flow chart showing an operational example of the point-allocation management server 100 according to an embodiment of the present disclosure.

FIG. 9 is a flow chart showing an operational example of the point-allocation management server 100 according to the embodiment of the present disclosure. FIG. 9 shows the details of calculating processing of the base point-allocation shown in step S101 in the flow chart shown in FIG. 8. Hereinbelow, a description will be given of an operational example of the point-allocation management server 100 according to the embodiment of the present disclosure by use of FIG. 9.

The point-allocation management server 100, when calculating the base point-allocation, first refers to a basic value to each question set on the question giving side, and determines the point allocation of each question on the basis of the basic value (step S111).

FIG. 10 is an explanatory diagram showing determination of point allocation of each question on the basis of a basic value. It is assumed that a test taken by the user is 1000 points as a perfect score. Then, it is assumed that a rate between point allocation based on the basic value and point allocation based on relative difficulty is 3:2. Therefore, the point allocation based on the basic value is 600 points as a perfect score, and the point allocation based on the relative difficulty is 400 points as a perfect score. Obviously, the total of scores and the rate of point allocation are not limited to the example.

In a case of allowing the user to answer five questions, it is assumed that the point-allocation management server 100 recognizes that the basic value of each question is set to 0.5, 1, 1, 1, and 1.5 in order from the first question by obtaining the question from the question management server 30 as shown in FIG. 10. Then, as shown in FIG. 10, the point-allocation management server 100 can determine the point allocation based on the basic value of each question to 60 points, 120 points, 120 points, 120 points, and 180 points in order from the first question.

The point-allocation management server 100 refers to the basic value to each question and determines the point allocation of each question on the basis of the basic value in step S111, and subsequently calculates the relative value that changes depending on the relative difficulty between the questions for all questions (step S112).

FIG. 11 is an explanatory diagram showing calculation of the relative value that changes depending on the relative difficulty between the questions. It is assumed that the point-allocation management server 100 recognizes that the relative difficulty between the questions is set to 1, 2, 4, 3, and 5 in the order from the first question, as shown in FIG. 11, by obtaining the question from the question management server 30. Then, the point-allocation management server 100 determines the point allocation (relative value) based on the difficulty of the first question as follows, $$400/(1+2+4+3+5)=400/15 \approx 26 \text{ points.}$$

Similarly, the point-allocation management server 100 determines the point allocation based on the difficulty after the second question to 52 points, 104 points, 78 points, and 130 points.

The point-allocation management server 100 calculates the relative value that changes depending on the relative difficulty between the questions for all questions in step S112, and subsequently calculates the base point-allocation from the point allocation based on the basic value calculated in step S111 and the relative value calculated in step S112 (step S113).

FIG. 12 is an explanatory diagram showing calculation of the base point-allocation. In a case where the point allocation based on the basic value of each question is determined to 60 points, 120 points, 120 points, 120 points, and 180 points in order from the first question and the relative values of the respective questions are determined to 26 points, 52 points, 104 points, 78 points, and 130 points in order from the first question, the point-allocation management server 100 adds both the values with respect to each question, and assumes 86 points, 172 points, 224 points, 198 points, and 310 pints as the base point-allocation, respectively.

The point-allocation management server 100 according to the embodiment of the present disclosure executes the above-mentioned series of operations, and thereby can calculate the base point-allocation of the respective questions. Obviously, as mentioned above, the total of scores and the rate of point allocation are not limited to the example. For example, in a case where the rate of the point allocation based on the basic value is set to 0, the base point-allocation of each question is determined only by the relative difficulty of the respective questions. In a case where the rate of the point allocation based on the relative difficulty is set to 0, the base point-allocation of the respective questions is determined only on the basis of the basic value.

Figure 13:
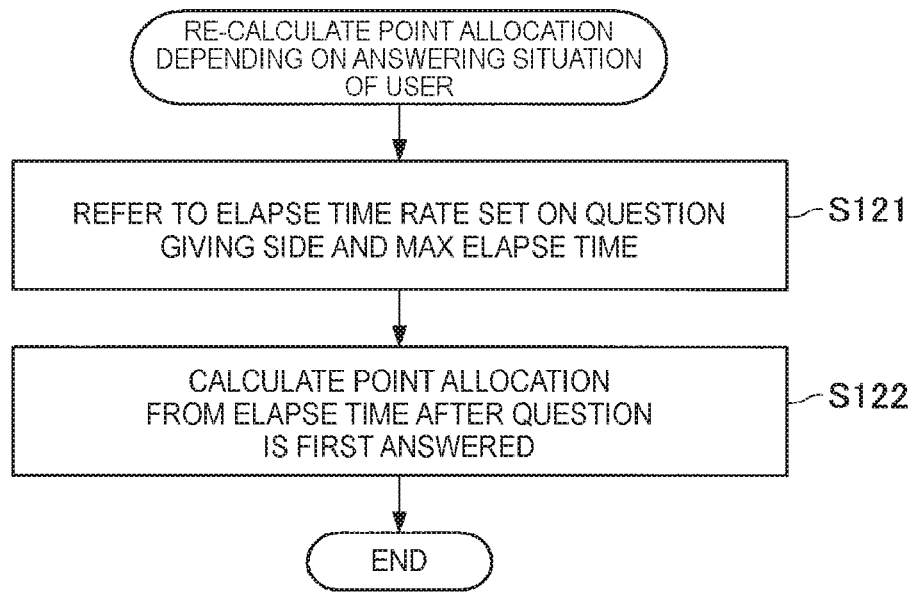
FIG. 13 is a flow chart showing an operational example of the point-allocation management server 100 according to an embodiment of the present disclosure.

FIG. 13 is a flow chart showing an operational example of the point-allocation management server 100 according to the embodiment of the present disclosure. FIG. 13 shows the details of re-calculating processing of the point allocation depending on an answering situation of the user shown in step S102 in the flow chart shown in FIG. 8. Hereinbelow, a description will be given of an operational example of the point-allocation management server 100 according to the embodiment of the present disclosure by use of FIG. 13.

The point-allocation management server 100, when re-calculating the point allocation depending on the answering situation of the user, first refers to an elapse time rate and the maximal passage time set on the question giving side (step S121).

First, definition of terms is shown. The elapse time means the elapse time after the user first made a correct answer. Further, the elapse time rate means a rate of the point allocation for reduction from the base point-allocation in accordance with the elapse time, prescribed as values between 0 and 1. In a case of 0, the reduction of points in accordance with the elapse time is not performed. In a case of 1, the maximal value of the reduction of points in accordance with the elapse time is the base point-allocation. Furthermore, the maximal elapse time means the maximal time length of the elapse time to which the reduction of points is considered after the user first made a correct answer. After the maximal elapse time, the maximal reduction of points set by the elapse time rate is applied. For example, in a case where the elapse time rate is 0.5 and the maximal elapse time is 30 minutes, the point allocation is reduced with the elapse of time for 30 minutes after the user first made a correct answer. In a case where the time is over 30 minutes after the user first made a correct answer, the point allocation is not reduced from the number of points as the half of the point allocation.

For example, a case is considered of determining the base point-allocation as shown in FIG. 12. It is assumed that the base point-allocation of the second question is 172 points, the elapse time rate set on the question giving side is 0.5, and the maximal elapse time is 600 seconds. Therefore, the reduction of points per second is as follows, $$172 \times 0.5/600 \approx 0.143 \text{ points.}$$

The point allocation is reduced by one point by one point for about 28 seconds after the user first made a correct answer.

The point-allocation management server 100, after referring to the elapse time rate and the maximal elapse time set on the question giving side, subsequently calculates the point allocation from the elapse time after the question is first answered.

A description will be given of an example of the case of the second question in FIG. 12 described above. With respect to the second question, it is assumed that, e.g., 300 seconds have elapsed after the user first made a correct answer. The reduction of points from the base point-allocation in this case is as follows, $$172 \times 0.5 \times 300/600 = 43 \text{ points.}$$

Therefore, with respect to the second question, the point allocation after the elapse of 300 seconds after the user first made a correct answer is as follows, $$172 - 43 = 129 \text{ points.}$$

The point-allocation management server 100 according to the embodiment of the present disclosure executes the above-described series of operations, reduces the points from the base point-allocation of each question, and thus can re-calculate the point allocation depending on the answering situation of the user. Further, the point-allocation management server 100 according to the embodiment of the present disclosure re-calculates the point allocation depending on the answering situation of the user, and thus performs the current point allocation of each question and calculates the score of the user based on the point allocation, and can generate information for presenting the information about the point allocation and the score to the answering terminal 200.

As mentioned above, the point-allocation management server 100 re-calculates the point allocation of each question during the test time and calculates the score of each user on the basis of the point allocation, thereby presenting the GUI, which will be described later, to the answering terminal 200.

FIGS. 14 to 17 are explanatory diagrams showing examples of the GUI displayed by the display unit 240 in the answering terminal 200. The GUIs shown in FIGS. 14 to 17 are displayed on the display unit 240 under, e.g., control of the control unit 230.

Figure 14:
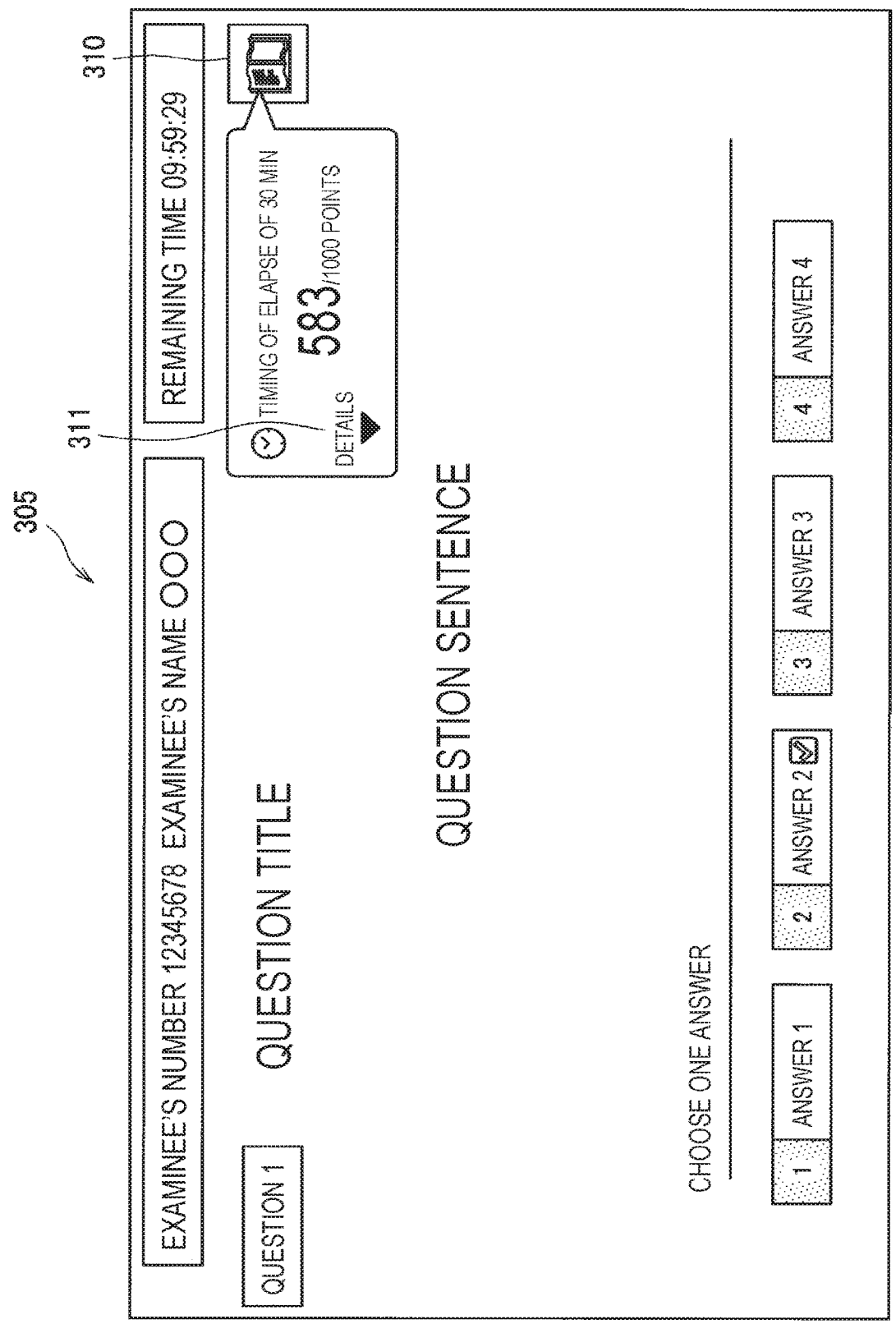
FIG. 14 is an explanatory diagram showing an example of a GUI displayed by a display unit 240 of the answering terminal 200.

A GUI 305 shown in FIGS. 14 and 15 are examples of the GUI for displaying the question sentence during the test time, similarly to the GUI 303 shown in FIG. 6. However, the GUI 305 shown in FIG. 14 shows, unlike the GUI 303, an examinee's number and a name of the user, the remaining time until the end of test, the question number and the question sentence, and an option of the answer to the question, and the score of the user at a predetermined time during the test time. The point-allocation management server 100 re-calculates the point allocation of each question during the test time, and calculates the score on the basis of the point allocation, thereby obtaining the score at the predetermined time during the test time.

The score at the predetermined timing during the test time may be displayed as shown in FIG. 14 by user's operation of selecting an icon 310, or may be automatically displayed as shown in FIG. 14 at the predetermined timing during the test time. A limitation may be set to the number of times of the operation of selecting the icon 310.

The GUI 305 shown in FIG. 14 shows the current score of the user. Herein, a graph showing the transition of the score of the user may be displayed as shown in FIG. 15 by user's operation of selecting an icon shown by reference numeral 311. FIG. 15 shows a graph showing the current score and order of the user and the current score and order of the user before 10 minutes. A GUI 307 shown in FIG. 14 may disclose the current score of another user that is designated in advance by the user.

Figure 16:
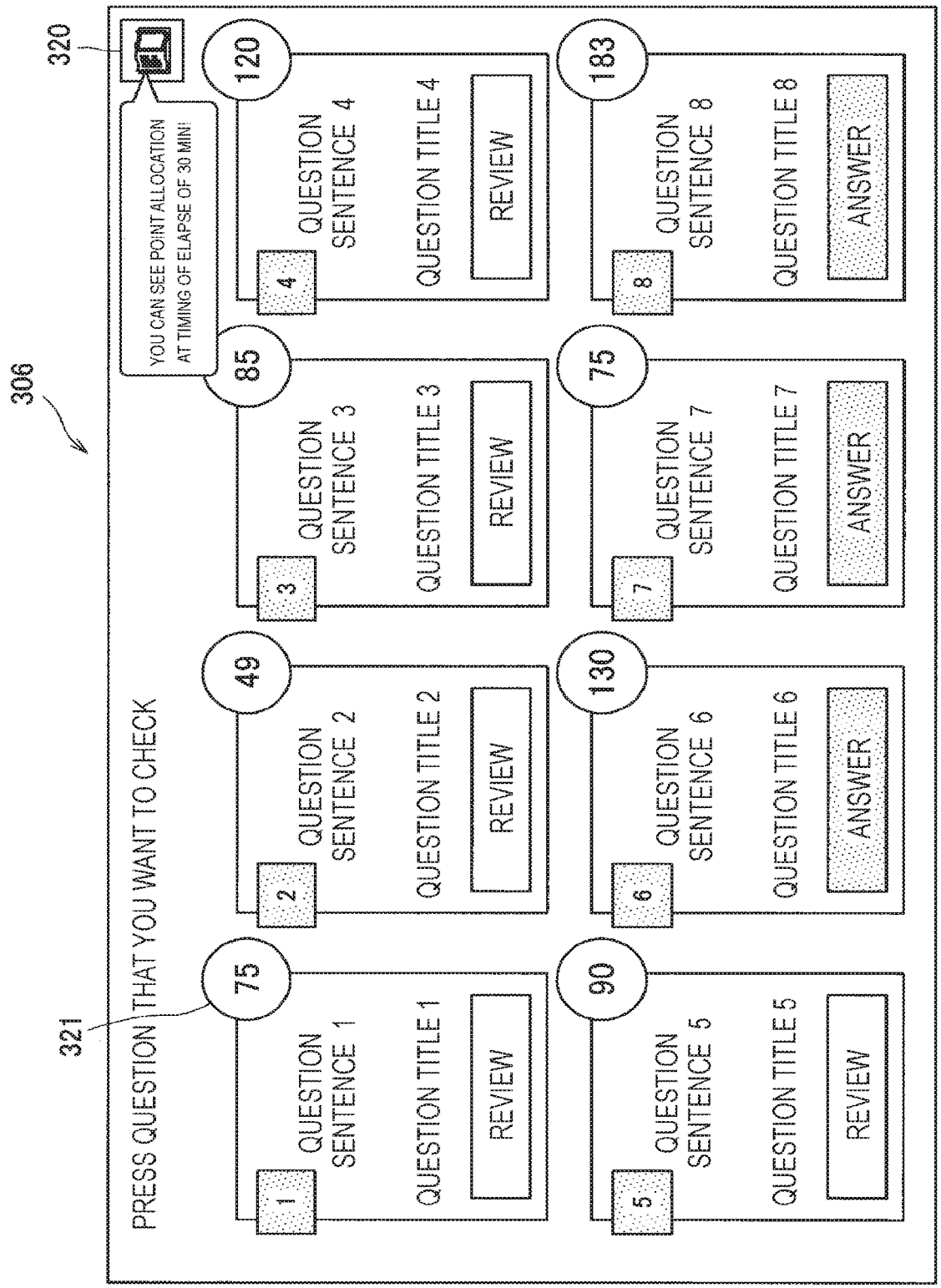
FIG. 16 is an explanatory diagram showing an example of a GUI displayed by a display unit 240 of the answering terminal 200.

A GUI 306 shown in FIG. 16 is an example of the GUI for displaying a list of questions during the test time, similarly to the GUI 304 shown in FIG. 7. However, the GUI 306 shown in FIG. 16, unlike the GUI 304, shows not only buttons for a question number of each question, a question sentence and a question title, and answering and reviewing each question but also an icon 320 for displaying the point allocation of each question, and a badge 321 showing the point allocation of each question.

When the user performs the operation of selecting the icon 320, the badge 321 is displayed which shows the point allocation of each question as shown in FIG. 16. A limitation may be set to the number of times for operation of selecting the icon 320. Further, at the predetermined time during the test time, the badge 321 showing the point allocation of each question may be automatically displayed.

Figure 17:
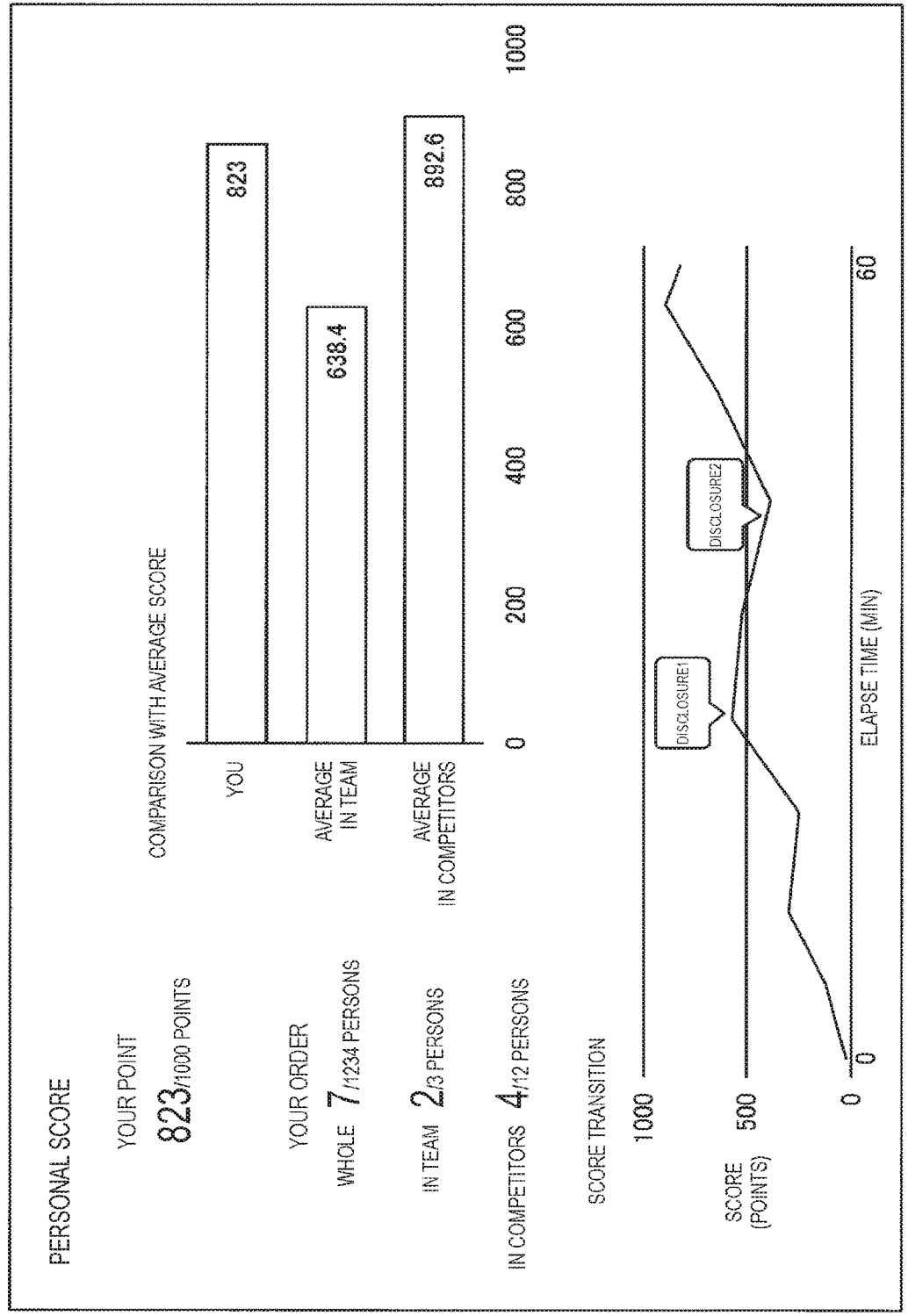
FIG. 17 is an explanatory diagram showing an example of a GUI displayed by a display unit 240 of the answering terminal 200.

A GUI 307 shown in FIG. 17 is an example of a GUI for displaying a personal score of a user after ending the test, similarly to the GUI 301 shown in FIG. 4. However, the GUI 307 shown in FIG. 7, unlike the GUI 301, shows comparison of the points, the order, and the average score of the user. The order of the user shows a graph showing the score that transits with the time elapse in addition to the order in the whole, the order in the team, and the order in the competitors. Moreover, the GUI 307 shown in FIG. 17 shows a graph of the score transition with timing for disclosing the score to the user. The disclosure of the score may be a result that is clearly indicated by the user, or a result that is automatically disclosed by the point-allocation management server 100. Furthermore, the GUI 307 shown in FIG. 17 may disclose the score of another user that is designated in advance by the user.

The point-allocation management server 100 according to the embodiment of the present disclosure re-calculates the point allocation depending on the answering situation of the user, thereby calculating the current point allocation of each question and the score of the user based on the point allocation as shown in FIGS. 14 to 17 and generating information for presenting the information on the point allocation and the score as the GUI to the answering terminal 200.

Note that the point-allocation management server 100 may hide (mask) a part of information without disclosing all information, when generating information for presenting the information about the point allocation and the score as the GUI to the answering terminal 200. For example, the point-allocation management server 100 may not disclose the point allocation of only a specific question until the end and may set such that the score of the user is not disclosed although the point allocation is disclosed, and, conversely, the point allocation is not disclosed although the score of the user is disclosed. Furthermore, in a case of hiding (masking) a part of the information, the point-allocation management server 100 may change a hiding range depending on users. For example, in a case where a plurality of users forming a team takes a test, which will be described later, the point-allocation management server 100 may generate information so that the information is disclosed to a leader of the team but is not disclosed to a user other than the leader.

It is described that the answer obtaining unit 120, when obtaining the answer input by the answering terminal 200, obtains information for identifying the user who answered the question, information for identifying the answered question, an answer to the question, and information about the time for answering the question. The answer obtaining unit 120 obtains the information from the answering terminal 200, and thus the point-allocation management server 100 can determine the point allocation that changes with time and disclose the point allocation to the user, as if answering the question in real time to the user, even if all users do not answer the question all at once at the same time.

1.4. Modification

In the above-described description, the example of calculating the point allocation about an individual user is shown. However, in the present embodiment, it is also assumed that not the individual user but a plurality of users forming a team takes a test. However, since the number of persons in a team is different depending on the team, fairness may be lost if the point allocation is determined as in the case of the individual user. For example, in a case of competing the order with the total score of a team, it is not fair if the point allocation is not changed between a team of three persons and a team of four persons.

Figure 18:
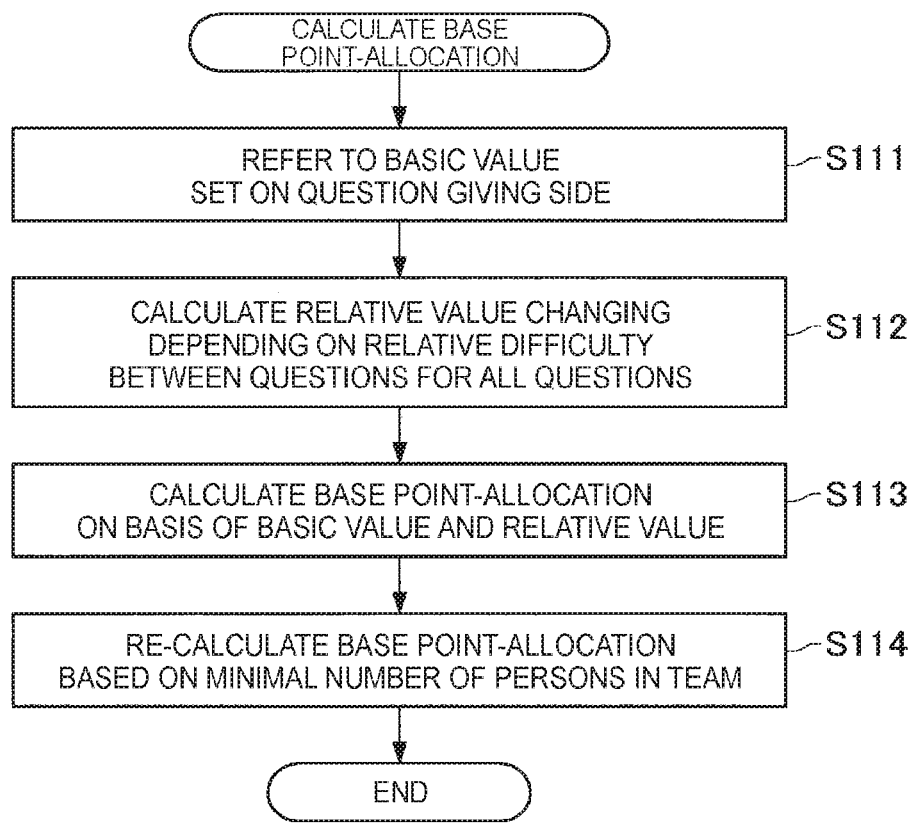
FIG. 18 is a flow chart showing an operational example of the point-allocation management server 100 according to an embodiment of the present disclosure.

FIG. 18 is a flow chart showing an operational example of the point-allocation management server 100 according to the embodiment of the present disclosure. FIG. 18 shows the details of a modification of calculating processing of the base point-allocation shown in step S101 in the flow chart shown in FIG. 8. Hereinbelow, a description will be given of an operational example of the point-allocation management server 100 according to the embodiment of the present disclosure by use of FIG. 18.

Steps to step S113 are the same as those in the operational example of the point-allocation management server 100 shown in FIG. 9, and a specific description thereof is omitted.

Further, when the base point-allocation is calculated in step S113, the point-allocation management server 100 re-calculates the base point-allocation on the basis of the minimal number of persons in a team (step S114). The minimal number of persons in the team is the minimal number of persons in one team that is predetermined, may be a team formed only by one person or may be a team that should be formed by a plurality of users.

FIG. 19 is an explanatory diagram showing an example of re-calculation of the base point-allocation based on the minimal number of persons in the team. Herein, an example is shown of re-calculating the base point-allocation based on the minimal number of persons in the team in a case where the minimal number of persons in the team is three.

In a case where the minimal number of persons in the team is three and the base point-allocation is determined as shown in FIG. 19, the base point-allocation of a four-person team is ¾ of the base point-allocation of each question as shown in FIG. 19. That is, in a case where the number of persons in the team is larger than the minimal number of persons in the team, the point allocation per person is smaller than that of a team of the minimal number of persons of the team.

Note that, in a case of taking a test by forming a team, a basic value set in advance on the question giving side, the elapse time rate, and the maximal elapse time may be different between an individual and a team. Further, in a case of taking a test by forming a team, the point allocation is not reduced after a correct answer was first made, but the point allocation may be reduced after a team whose persons all made correct answers first appears.

Note that, in a case of taking a test by forming a team, the point-allocation management server 100 may generate information for allowing the GUI 306 shown in FIG. 16 to display the number of persons who answered the respective questions. Further, in a case of taking a test by forming a team, the point-allocation management server 100 may generate information as the base of the GUI so as to allow only a leader of the team to grasp the number of persons who answered the respective questions. Furthermore, in a case where a message for each member of the team is input from the leader of the team with the answering terminal 200, the point-allocation management server 100 may generate the information for allowing the input message to be displayed on the answering terminal 200 of each member. Note that the leader of the team may be a user who answers the question or a user who only views the situation of a member of the team without answering the question.

2. HARDWARE CONFIGURATION EXAMPLE

Figure 20:
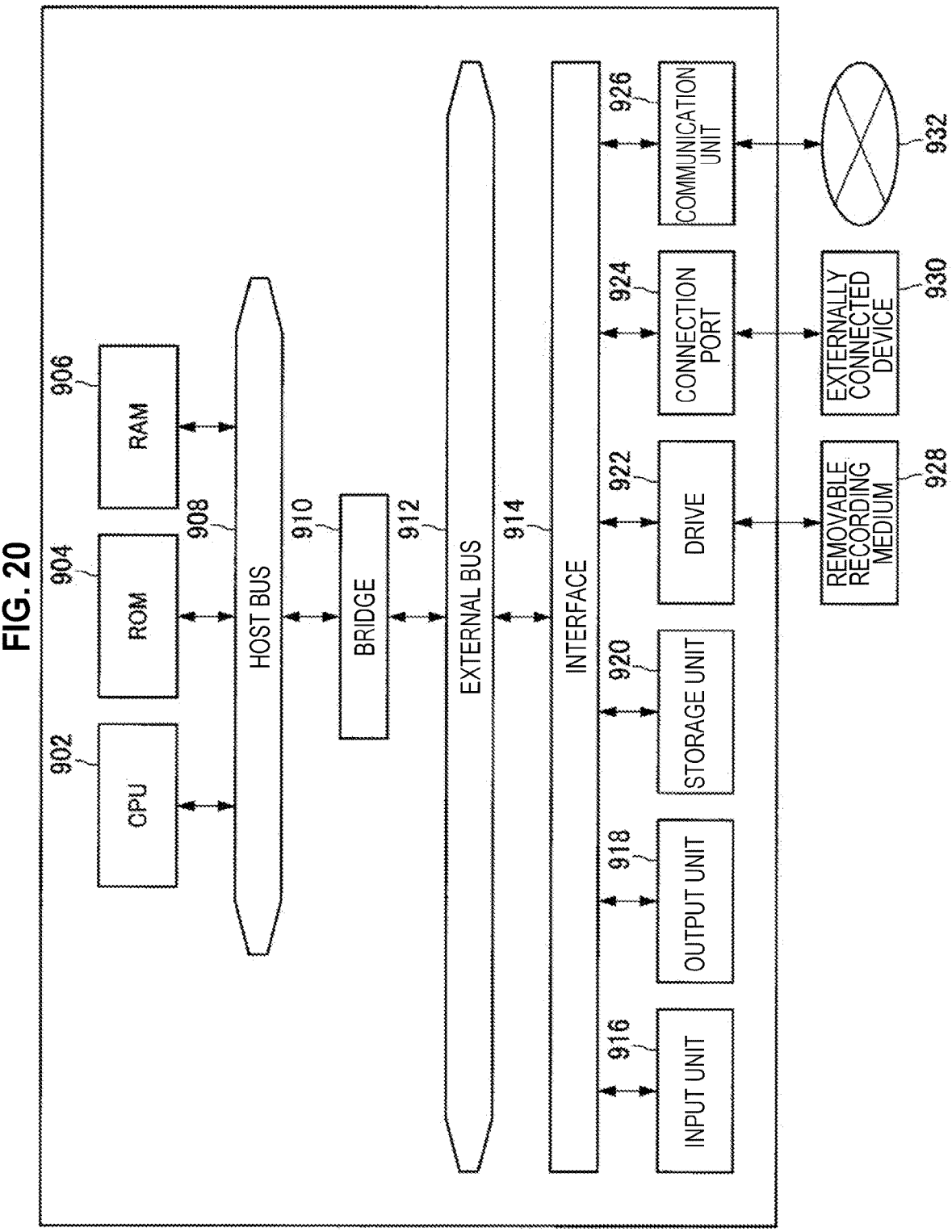
FIG. 20 is an explanatory diagram showing a hardware configuration example.

Next, a hardware configuration of the point-allocation management server 100 and the answering terminal 200 according to an embodiment of the present disclosure will be described with reference to FIG. 20. FIG. 20 is a block diagram illustrating a hardware configuration example of the point-allocation management server 100 and the answering terminal 200 according to the embodiment of the present disclosure. Each of the algorithms described above can be performed by using, for example, the hardware configuration of the information processing apparatus shown in FIG. 20. That is, the processing of each of the algorithms can be realized by controlling the hardware shown in FIG. 20 using a computer program.

Note that the mode of this hardware shown in FIG. 20 is arbitrary, and may be, for example, a personal computer, a mobile information terminal such as a mobile phone, a PHS or a PDA, a game machine, a contact or non-contact IC chip, a contact or non-contact IC card, a loud speaker, a television set, a monitor, a wearable device, or various types of information appliances. Moreover, the PHS is an abbreviation for Personal Handy-phone System. Also, the PDA is an abbreviation for Personal Digital Assistant.

As shown in FIG. 20, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, and controls entire operation or a part of the operation of each structural element on the basis of various programs recorded on the ROM 904, the RAM 906, the storage unit 920, or a removable recording medium 928. The ROM 904 is a device for storing a program to be read by the CPU 902 or data or the like used in an arithmetic operation. The RAM 906 temporarily or perpetually stores, for example, a program to be read by the CPU 902 or various parameters or the like appropriately changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote controller that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. The CRT is an abbreviation for Cathode Ray Tube. In addition, the LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removable recording medium 928, for example, a magnetic disk, an optical disc, a magneto-optical disc, or a semiconductor memory, or writes information in the removable recording medium 928. The removable recording medium 928 is, for example, a DVD medium, a Blu-ray medium, an HD-DVD medium, various types of semiconductor storage media, or the like. Of course, the removable recording medium 928 may be, for example, an electronic device or an IC card on which a non-contact IC chip is mounted. The IC is an abbreviation for Integrated Circuit.

The connection port 924 is, for example, a USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. The USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a device for contact or non-contact communication. In addition, the network 932 connected to the communication unit 926 is configured from a wire-connected or wirelessly connected network, and is the Internet, a home-use LAN, infrared communication, visible light communication, broadcasting, or satellite communication, for example. The LAN is an abbreviation for Local Area Network. Also, the WUSB is an abbreviation for Wireless USB. Furthermore, the ADSL is an abbreviation for Asymmetric Digital Subscriber Line.

The example of the hardware configuration of the point-allocation management server 100 and the answering terminal 200 has been described. Each of the structural elements described above may be configured by using a general purpose component or may be configured by hardware specialized for the function of each of the structural elements. The configuration may be changed as necessary in accordance with the state of the art at the time of working of the present disclosure.

3. CONCLUSION

As mentioned above, according to the embodiment of the present disclosure, the point-allocation management server 100 is provided which re-calculates point allocation of a question during a test time, calculates a score of a user on the basis of the re-calculated point allocation, and generates information for disclosing the point allocation and the score.

The point-allocation management server 100 according to the embodiment of the present disclosure re-calculates the point allocation of the question during the test time, calculates a score of a user on the basis of the recalculated point allocation, and generates information for disclosing the point allocation and the score, thereby disclosing the point allocation of each question and the score of the user during the test time to the answering terminal 200. The point allocation of each question and the score of the user during the test time can be disclosed on the answering terminal 200, and thus it is possible for the point-allocation management server 100 according to the embodiment of the present disclosure to provide a user with enjoyment of taking a test.

It may not be necessary to chronologically execute respective steps in the processing, which is executed by each device of this specification, in the order described in the sequence diagrams or the flow charts. For example, the respective steps in the processing which is executed by each device may be processed in the order different from the order described in the flow charts, and may also be processed in parallel.

Furthermore, it becomes possible to generate a computer program which makes a hardware device, such as a CPU, a ROM, and a RAM incorporated in each device demonstrate the functions equivalent to the configurations of the above described devices. In addition, it becomes also possible to provide a storage medium which stores the computer program. In addition, respective functional blocks shown in the functional block diagrams may be constituted from hardware devices or hardware circuits so that a series of processes may be implemented by the hardware devices or hardware circuits.

In addition, some or all of the functional blocks shown in the functional block diagrams used in the above description may be implemented by a server device that is connected via a network, for example, the Internet. In addition, configurations of the functional blocks shown in the functional block diagrams used in the above description may be implemented in a single device or may be implemented in a system in which a plurality of devices cooperate with one another. The system in which a plurality of devices cooperate with one another may include, for example, a combination of a plurality of server devices and a combination of a server device and a terminal device.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Note that the effects described above are not necessarily limitative. With or in the place of the above effects, there may be achieved any one of the effects described in this specification or other effects that may be grasped from this specification.

Additionally, the present technology may also be configured as below.

(1)
An information processing device including:
a control unit configured to determine point allocation of each question in a test on a basis of answer results of the test made by a plurality of users during a test time, calculate a score of a predetermined user on a basis of the point allocation in response to a request of the predetermined user, and generate information for disclosing the score of the predetermined user.

(2)
The information processing device according to (1), wherein the control unit additionally generates information for disclosing point allocation of each question in the test.

(3)
The information processing device according to (1) or (2), wherein, in a case where a plurality of users constitutes a group, the control unit generates information for disclosing a score of a user included in the group to each user in the group.

(4)
The information processing device according to any one of (1) to (3), wherein, in a case where a plurality of users constitutes a group, the control unit generates information for disclosing a message for a user included in the group to each user in the group.

(5)
The information processing device according to (4), wherein the message is sent from a user who has not taken the test.

(6)
The information processing device according to any one of (1) to (5), wherein the control unit generates information for disclosing a score of another user set by a user to the user.

(7)
The information processing device according to any one of (1) to (6), wherein the control unit determines point allocation of each question in the test on a basis of an answer result of another user and information of a relative time from test start to answer.

(8)
The information processing device according to any one of (1) to (7), wherein the control unit generates information for masking a part of information and disclosing the other part of the information.

(9)
The information processing device according to (8), wherein the control unit adjusts a masking range depending on each user.

(10)
The information processing device according to any one of (1) to (9), wherein the control unit generates information for disclosing a score of a user in a case where a predetermined condition is satisfied during the test time.

(11)
The information processing device according to (10), wherein the predetermined condition is elapse of a predetermined time from test start.

(12)
The information processing device according to any one of (1) to (11), wherein the control unit determines point allocation as a reference for each of the questions on a basis of a basic value that is preset and a relative value that changes depending on relative difficulty between questions.

(13)
The information processing device according to (12), wherein the control unit reduces, in accordance with elapse of time after each of the questions is first answered, point allocation of each of the questions from the point allocation as a reference.

(14)
An information processing method including:
determining point allocation of each question in a test on a basis of answer results of the test made by a plurality of users during a test time;
calculating a score of a predetermined user on a basis of the point allocation in response to a request of the predetermined user; and generating information for disclosing the score of the predetermined user.

(15)

A computer program for causing a computer to execute:

determining point allocation of each question in a test on a basis of answer results of the test made by a plurality of users during a test time;

calculating a score of a predetermined user on a basis of the point allocation in response to a request of the predetermined user; and generating information for disclosing the score of the predetermined user.

REFERENCE SIGNS LIST 10 information processing system
20 network
30 question management server
100 point-allocation management server
110 question obtaining unit
120 answer obtaining unit
130 control unit
132 point-allocation determining unit
134 information generating unit
200 answering terminal
210 input unit
220 storage unit
230 control unit
240 display unit
310 icon
320 icon
321 badge

The invention claimed is:

1. A test taking information processing device comprising:

control circuitry configured to during a test time of a test, send instructions to cause a concurrent presentation of a plurality of questions along with a respective numerical point allocation for each question on a graphical user interface of a terminal for presentation to a first user;

during the test time of the test, update a numerical point allocation of a question in the test after receiving a correct answer result for the question, the correct answer result made by a second user of a plurality of users taking the test during the test time;

during the test time of the test, calculate the updated numerical point allocation of the correctly answered question based upon the answer result from the second user being correct and answered in time before a correct answer is determined to be received for the same question from the first user; and during the test time of the test, send information to cause a presentation of the updated numerical point allocation for the correctly answered question to be displayed with the concurrent presentation of the plurality of questions along with the respective numerical point allocation for each other question, the updated numerical point allocation for the correctly answered question and the respective numerical point allocation for each other question displayed concurrently on the graphical user interface of the terminal for presentation to the first user;

wherein the updated numerical point allocation is less than an original numerical point allocation for the correctly answered question;

during the test time of the test, the updated numerical point allocation for the correctly, answered question and the respective numerical point allocation for each other question are each presented next to the respective question with a respective input selection, the respective input selection when selected resulting in the selected question being presented to the first user.

2. The test taking information processing device according to claim 1, wherein, in a case where the plurality of users constitutes a group, the control circuitry generates information for disclosing a score of a user included in the group to each user in the group.

3. The information processing device according to claim 1, wherein, in a case where the plurality of users constitutes a group, the control circuitry generates information for disclosing a message for a user included in the group to each user in the group.

4. The test taking information processing device according to claim 3, wherein the message is sent from a user who has not taken the test.

5. The test taking information processing device according to claim 1, wherein the control circuitry generates information for disclosing a score of another user set by a user to the user.

6. The test taking information processing device according to claim 1, wherein the control circuitry generates information for masking a part of information and disclosing the other part of the information.

7. The test taking information processing device according to claim 6, wherein the control circuitry adjusts a masking range depending on each user.

8. The test taking information processing device according to claim 1, wherein the control circuitry generates information for disclosing a score of a user in a case where a predetermined condition is satisfied during the test time.

9. The test taking information processing device according to claim 8, wherein the predetermined condition is elapse of a predetermined time from test start.

10. The test taking information processing device according to claim 1, wherein the control circuitry determines point allocation as a reference for each of the questions on a basis of a basic value that is preset and a relative value that changes depending on relative difficulty between questions.

11. The test taking information processing device according to claim 10, wherein the control circuitry reduces, in accordance with elapse of time after each of the questions is first answered, point allocation of each of the questions from the point allocation as a reference.

12. A test taking information processing method comprising:

during a test time of a test, sending instructions to cause a concurrent presentation of a plurality of questions along with a respective numerical point allocation for each question on a graphical user interface of a terminal for presentation to a first user;

during the test time of the test, updating a numerical point allocation of a question in the test after receiving a correct answer result for the question, the correct answer result made by a second user of a plurality of users taking the test during the test time;

during the test time of the test, calculating the updated numerical point allocation of the correctly answered question based upon the answer result from the second user being correct and answered in time before a correct answer is determined to be received for the same question from the first user; and during the test time of the test, sending information to cause a presentation of the updated numerical point allocation for the correctly answered question to be displayed with the concurrent presentation of the plurality of questions along with the respective point allocation for each other question, the updated numerical point allocation for the correctly answered question and the respective numerical point allocation for each other question displayed concurrently on the graphical user interface of the terminal for presentation to the first user;

wherein the updated numerical point allocation is less than an original point allocation for the correctly answered question;

during the test time of the test, presenting the updated numerical point allocation for the correctly answered question and each of the respective numerical point allocations, each presented next to the respective question with a respective input selection, the respective input selection when selected resulting in the selected question being presented to the first user.

13. A test taking computer program for causing a computer to execute:

during a test time of a test, sending instructions to cause a concurrent presentation of a plurality of questions along with a respective numerical point allocation for each question on a graphical user interface of a terminal for presentation to a first user;

during the test time of the test, updating a numerical point allocation of a question in the test after receiving a correct answer result for the question, the correct answer result made by a second user of a plurality of users taking the test during the test time;

during the test time of the test, calculating the updated numerical point allocation of the correctly answered question based upon the answer result from the second user being correct and answered in time before a correct answer is determined to be received for the same question from the first user; and during the test time of the test, sending information to cause a presentation of the updated numerical point allocation for the correctly answered question to be displayed with the concurrent presentation of the plurality of questions along with the respective point allocation for each other question, the updated numerical point allocation for the correctly answered question and the respective numerical point allocation for each other question displayed concurrently on the graphical user interface of the terminal for presentation to the first user;

wherein the updated numerical point allocation is less than an original point allocation for the correctly answered question;

during the test time of the test, presenting the updated numerical point allocation for the correctly answered question and each of the respective numerical point allocations, each presented next to the respective question with a respective input selection, the respective input selection when selected resulting in the selected question being presented to the first user.

\* \* \* \* \*